United States Patent
Tsuchi et al.

(10) Patent No.: US 7,095,991 B2
(45) Date of Patent: Aug. 22, 2006

(54) POWER SAVING DRIVING METHOD OF MOBILE TELEPHONE

(75) Inventors: Hiroshi Tsuchi, Tokyo (JP); Kohei Okamoto, Tokyo (JP); Toshio Watanabe, Tokyo (JP); Yoshikazu Seko, Otsu (JP); Seiichi Suzuki, Otsu (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/296,984

(22) PCT Filed: Jun. 1, 2001

(86) PCT No.: PCT/JP01/04646

§ 371 (c)(1),
(2), (4) Date: Aug. 18, 2003

(87) PCT Pub. No.: WO01/95596

PCT Pub. Date: Dec. 13, 2001

(65) Prior Publication Data

US 2004/0029546 A1    Feb. 12, 2004

(30) Foreign Application Priority Data

Jun. 2, 2000  (JP)  ............................. 2000-165585

(51) Int. Cl.
 H04B 1/18   (2006.01)
 G09G 3/36   (2006.01)
 G09G 5/00   (2006.01)

(52) U.S. Cl. ....................... 455/159.1; 345/99; 345/204

(58) Field of Classification Search ................ 455/574, 455/159.1; 345/99, 204
See application file for complete search history.

(56) References Cited

U.S. PATENT DOCUMENTS

| 6,075,510 A * | 6/2000 | Blouin et al. ................... 345/99 |
| 2002/0036624 A1 * | 3/2002 | Ohta et al. ..................... 345/204 |
| 2004/0029546 A1 * | 2/2004 | Tsuchi et al. ................ 455/159.1 |

FOREIGN PATENT DOCUMENTS

| GB | 2325821 | 12/1998 |
| JP | 7-230077 | 8/1995 |
| JP | 10-039842 | 2/1998 |
| JP | A 10-65598 | 3/1998 |
| JP | 10-107883 | 4/1998 |
| JP | 10-190786 | 7/1998 |
| JP | 10-200615 | 7/1998 |
| JP | A 11-119750 | 4/1999 |
| JP | 2000-105573 | 4/2000 |
| JP | A 2000-338461 | 12/2000 |

* cited by examiner

Primary Examiner—William D. Cumming
(74) Attorney, Agent, or Firm—Young & Thompson

(57) ABSTRACT

In a mobile phone having a liquid crystal display unit, the entire liquid crystal display unit is displayed in a simple display mode at lest in a non-operating standby mode. In the simple display mode, the entire liquid crystal display unit is driven by reducing the number of gradation levels or by decreasing a liquid crystal driving voltage. By using such a controlling method, the power consumption of the liquid crystal display unit can be reduced in the non-operating standby mode. On the other hand, necessary information such as time and the amount of remaining battery is displayed such that the information can be read.

11 Claims, 13 Drawing Sheets

POWER SAVING DRIVING METHOD OF MOBILE TELEPHONE

TECHNICAL FIELD

The present invention relates to a power-saving driving method for a display device. Specifically, the present invention relates to a power-saving driving method for a display device which can be effectively applied to a mobile phone including a thin-film transistor liquid crystal display (TFT-LCD).

BACKGROUND ART

In the field of mobile phones, new models of multifunction are being developed one after another. Multifunction is a requirement of the time. On the other hand, extending a continuous operation time without charging has been a fundamental requirement. In this circumstance, various power-saving measures are proposed, some of them being conducted.

In a mobile phone, power is consumed not only during a phone call but also in a standby mode. The power-consuming part of a mobile phone includes a control unit (CPU) for controlling the entire mobile phone, a radio communication unit for performing transmission/reception, and a display unit.

For example, in a folding mobile phone, in which the display unit cannot be seen when folded, the display unit is not driven so as to save power when the mobile phone is folded and is in a standby mode. Since the display unit cannot be seen when the mobile phone is folded, power-saving measures in which the display unit is not driven is very effective and practical.

However, in an ordinal mobile phone which cannot be folded, time and the amount of remaining battery should be displayed even in a non-operating standby mode. Therefore, most of commercially available mobile phones are configured such that time and the amount of remaining battery are displayed.

In response to such requirements, mobile phones including an STN-type liquid crystal display unit, which have the following function, have been proposed. That is, the entire liquid crystal display unit is not driven and only time and the amount of remaining battery can be partially displayed in a non-operating standby mode.

On the other hand, the display unit of mobile phones is expected to shift from an STN-type liquid display to a TFT-LCD in accordance with requirements of colorization, high-resolution, and moving image. Since power consumption will increase in accordance with colorization, high-definition, and adoption of a TFT-LCD, requirement for power saving will further increase. However, the TFT-LCD uses a different driving technique from that for the STN-type liquid crystal display. Thus, the above-described power-saving measures for the STN-type liquid crystal display unit cannot be applied to the TFT-LCD. Therefore, under present circumstances, only a method as disclosed in Japanese Unexamined Patent Application Publication No. 10-65598, in which the entire display unit is not at all driven, can be applied in order to save power in the TFT-LCD. In this method, however, time and the amount of remaining battery cannot be displayed in a non-operating standby mode.

Accordingly, the present invention provides a power-saving driving method for a TFT-LCD display device in which required information can be displayed while reducing power consumption in a TFT-LCD in a non-operating standby mode in a mobile phone or the like including a TFT-LCD.

DISCLOSURE OF INVENTION

The present invention provides a power-saving driving method for a mobile phone including a liquid crystal display unit which is driven in a detailed display mode with all gradation levels. At least in a non-operating standby mode, the liquid crystal display unit is driven in a simple display mode in which the entire liquid crystal display unit is displayed with a smaller amount of electrical power as compared with the detailed display mode.

In the simple display mode, the entire liquid crystal display unit can be driven by reducing the number of gradation levels or by decreasing a liquid crystal driving voltage.

As described above, required information such as time and the amount of remaining battery must be displayed even in the non-operating standby mode in a mobile phone. On the other hand, since the amount of the required information is small, the information can be displayed in a simple mode. Currently, for example, information is displayed with 8 gradation levels or more in an operating mode. However, information such as time and the amount of remaining battery does not have to be displayed clearly or in detail with 8 gradation levels or more.

Specifically, information such as time and the amount of remaining battery can be adequately read even when the entire liquid display unit is displayed with 2 gradation levels. When the display is colorized, 8-color display can be realized by using 2 gradation levels for each R, G, and B. On the other hand, when the entire liquid crystal display unit is driven by decreasing the liquid crystal driving voltage and by decreasing the difference between gradation levels while the number of gradation levels is remained to be the same, the brightness decreases and thus the contrast also decreases. However, the information such as time and the amount of remaining battery can be adequately read.

In this way, by reducing the number of gradation levels for liquid crystal display, the power consumption in an operation amplifier forming the analog buffer of the liquid crystal display device can be reduced so as to realize power saving. Also, by decreasing the liquid crystal driving voltage in the liquid crystal display device, electrical charges of charging and discharging generated every time the gradation level changes can be reduced, and thus power saving can be realized.

BEST MODE FOR CARRYING OUT THE INVENTION

Hereinafter, embodiments of the present invention will be described with reference to the attached drawings.

Figure 1:
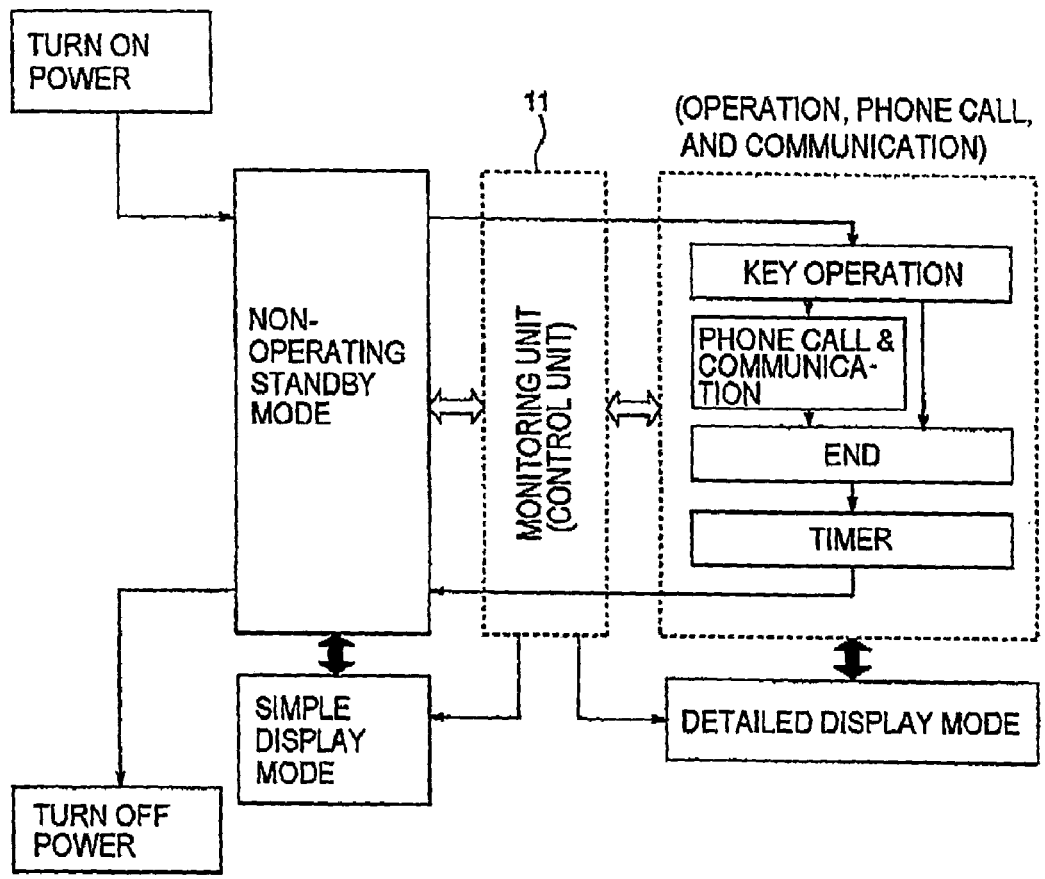
FIG. 1 illustrates a power-saving driving method for a mobile phone according to a first embodiment of the present invention.

FIG. 1 illustrates a power-saving driving method for a mobile phone according to a first embodiment of the present invention. When the power of a mobile phone in an OFF-state is turned ON, the mobile phone is controlled by a monitoring unit (control unit) 11 in the mobile phone so as to be switched to a non-operating standby mode. In this state, a liquid crystal display of the mobile phone is driven in a simple display mode under the control of the monitoring unit (control unit) 11 in the mobile phone.

When the user operates a key of the mobile phone, makes a phone call, or performs communication, the mobile phone is put into an operating mode, a call mode, or a communication mode under the control of the monitoring unit (control unit) 11. When the mobile phone is put into a mode other than the non-operating standby mode, the liquid crystal display is put into a detailed display mode with all gradation levels under the control of the monitoring unit (control unit) 11. When the key operation, phone call, or communication ends, a timer provided in the mobile phone is started. Then, after a predetermined time has elapsed, the monitoring unit (control unit) 11 controls the mobile phone so that the mobile phone is put into the non-operating standby mode, where the liquid crystal display of the mobile phone operates in the simple display mode.

When the liquid crystal display of the mobile phone is in the detailed display mode, a TFT-LCD drive circuit drives the liquid crystal with an analog voltage corresponding to all gradation levels so that the liquid crystal display shows all gradation levels. Alternatively, the liquid crystal may be driven with an analog voltage corresponding to a reduced number of gradation levels by using frame rate control or the like.

On the other hand, when the liquid crystal display of the mobile phone is in the simple display mode, the TFT-LCD drive circuit drives the liquid crystal with, for example, two power-supply voltages (for example, 5 V and 0 V) used in a drive stage. Also, when the liquid crystal display of the mobile phone is in the simple display mode, the TFT-LCD drive circuit drives the liquid crystal with a drive power-supply voltage which is lower than the drive power-supply voltage in the detailed display mode. For example, if the drive power-supply voltage in the detailed display mode is a power-supply voltage of 5 V, the lower drive power-supply voltage is 3 V.

Figure 2:
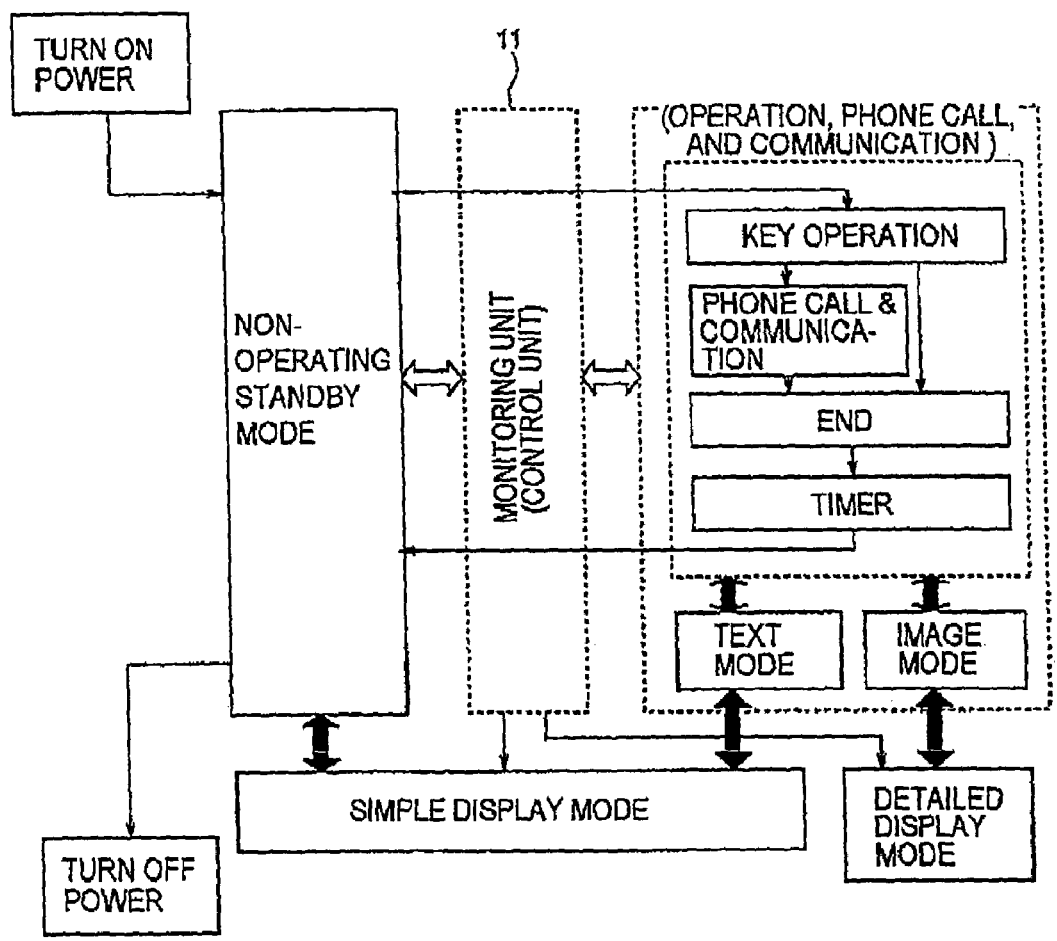
FIG. 2 illustrates a power-saving driving method for a mobile phone according to a second embodiment of the present invention.

FIG. 2 illustrates a power-saving driving method for a mobile phone according to a second embodiment of the present invention. The second embodiment is a modification of the first embodiment and has a configuration in which the monitoring unit (control unit) 11 in the mobile phone can determine whether a text mode in which only character information and icons are displayed or an image mode in which image information and so on is displayed is set, even when the mobile phone is in a mode other than the non-operating standby mode. In the non-operating standby mode, the liquid crystal display of the mobile phone operates in the simple display mode, as in the first embodiment.

In the second embodiment, the monitoring unit (control unit) 11 controls the mobile phone so that the liquid crystal display of the mobile phone operates in the simple display mode in the text mode and operates in the detailed display mode in the image mode, even in a mode other than the non-operating standby mode.

For example, when only character information is displayed, the character information can be read without difficulty even if the information is displayed in the simple display mode, because the contrast of the characters and their background is clear. Also, since icons in a menu page are clearly designed and colored with a few colors, the icons can be recognized without difficulty even in the simple display mode. Herein, text mode refers to a display mode in which a multi-color display using more than hundreds of colors is not always required. In the text mode, information on the display can be easily recognized even in the simple display mode.

The monitoring unit (control unit) 11 determines whether the text mode or the image mode is set relatively easily by using a software tool for displaying an image. For example, when a tool for displaying an image is started by using a tool selection page in the text mode, the mode is switched to the image mode where display with all gradation levels can be performed. When the tool ends, the mode can be easily returned to the text mode.

Figure 3:
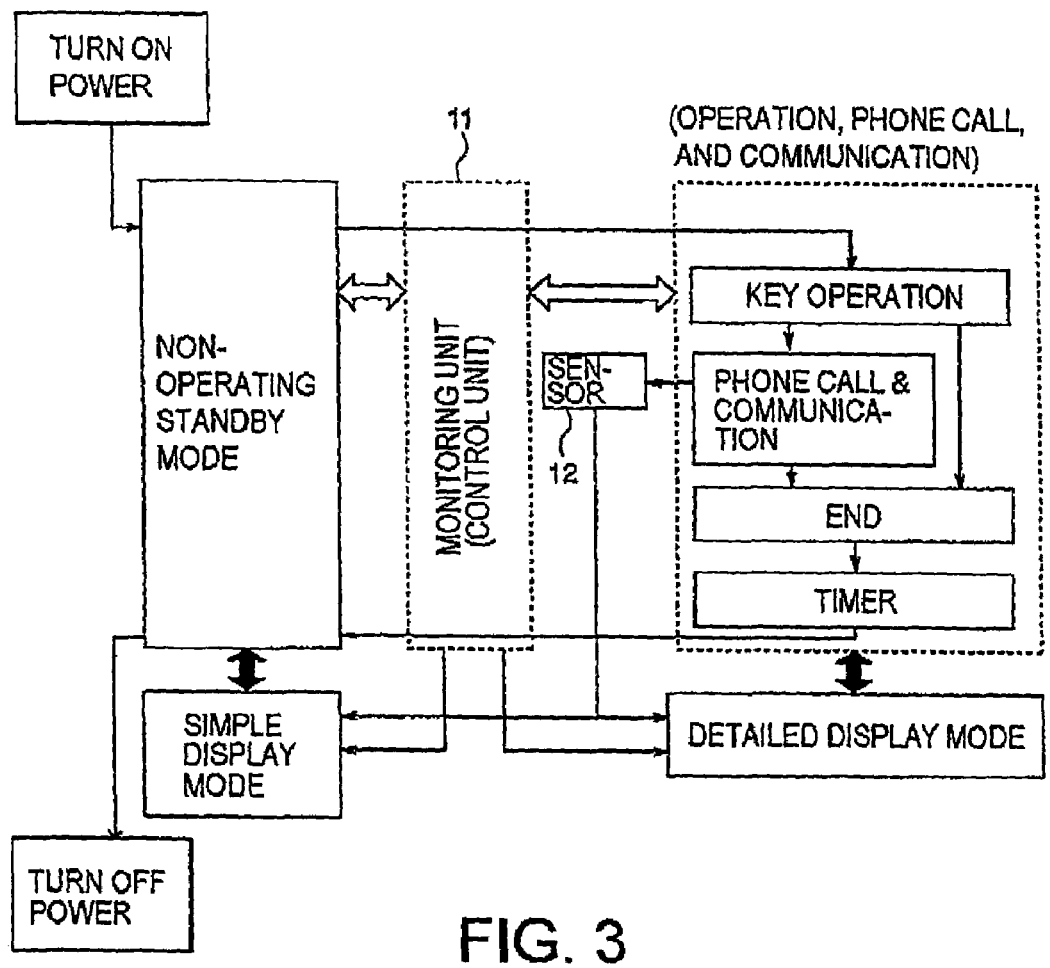
FIG. 3 illustrates a power-saving driving method for a mobile phone according to a third embodiment of the present invention.

FIG. 3 illustrates a power-saving driving method for a mobile phone according to a third embodiment of the present invention. The third embodiment is a modification of the first embodiment. Since the basic operation thereof is exactly the same as that in the first embodiment, the description of the basic operation will be omitted.

In the third embodiment, in a mode other than the non-operating standby mode, the liquid crystal display of the mobile phone is switched to the simple display mode when it is detected that the display unit of the mobile phone cannot be seen by the user, for example, when an ear-contact sensor detects that the mobile phone is touching the ear of the user during a phone call. Accordingly, more effective power saving can be achieved.

Figure 4:
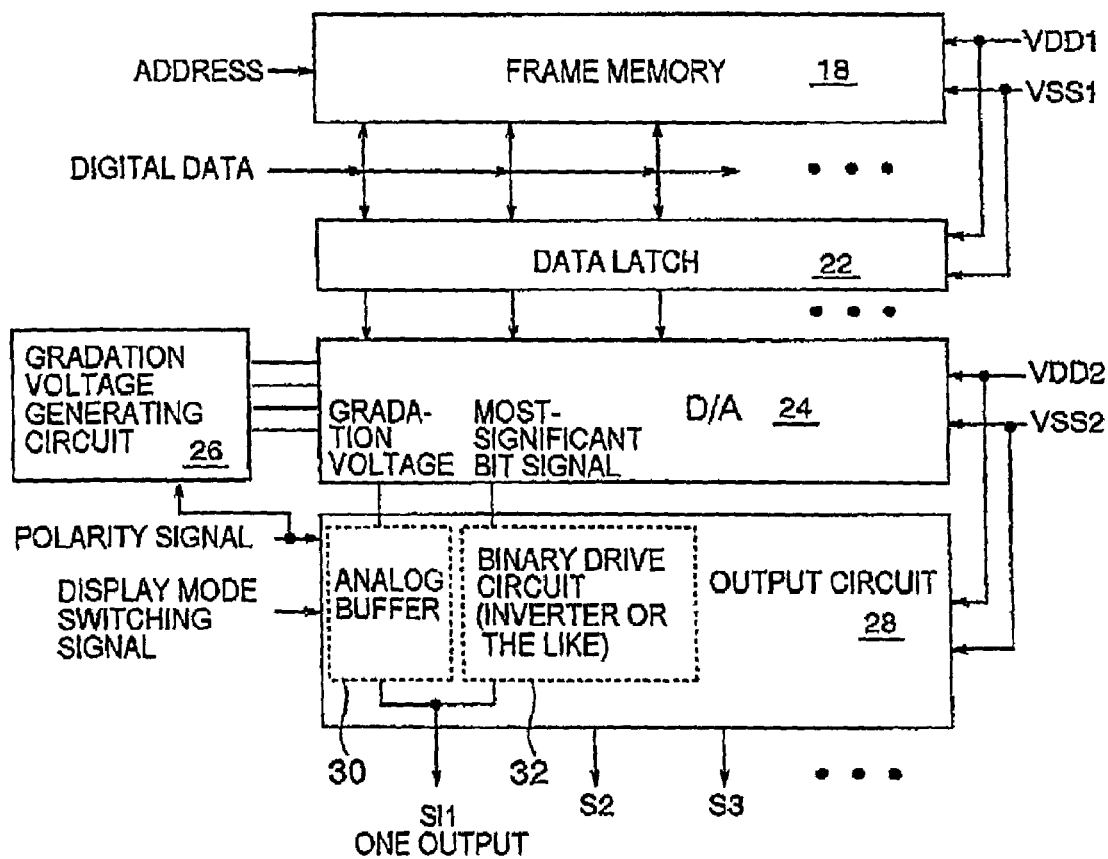
FIG. 4 is a block diagram showing an embodiment in which the entire liquid crystal display unit is driven by reducing the number of gradation levels in a simple display mode.

FIG. 4 illustrates an embodiment in which the entire liquid crystal display is driven by reducing the number of gradation levels in the simple display mode, and is a block diagram of a data line drive circuit of the liquid crystal display device provided in the mobile phone.

As shown in FIG. 4, the data line drive circuit includes a frame memory 18, a data latch 22, a D/A converter 24, a gradation voltage generating circuit 26, and an output circuit 28. Referring to FIG. 4, digital data corresponding to the display is written in the frame memory 18 in accordance with an address, the digital data corresponding to each scanning line is sequentially read out from the frame memory 18 so as to be transmitted to the data latch 22, a gradation voltage corresponding to the digital data is selected in the D/A converter 24, and the selected voltage is amplified in the output circuit 28 so as to be output to a data line. As shown in FIG. 4, in the data line drive circuit including the frame memory 18, the same data as the previous frame can be read from the frame memory 18 when the same display is continuously performed. Therefore, it can be suspended to input digital data to the data line drive circuit during that time, and thus the power consumption required for data transfer can be reduced. A polarity signal is a signal synchronized with AC driving for preventing deterioration of the liquid crystal, and is supplied to the gradation voltage generating circuit 26 and the output circuit 28. In the gradation voltage generating circuit 26, a gradation level is inverted in accordance with the polarity signal, and thus an analog voltage corresponding to the polarity can be supplied to the D/A converter 24 for the same data. In FIG. 4, the output circuit 28 has a configuration peculiar to the present invention, which is different from the known art.

According to the present invention, the output circuit 28 includes a known analog buffer 30 and a binary drive circuit 32 for each data line output S1, S2, S3, . . . . Either the analog buffer 30 or the binary drive circuit 32 is operated in response to a display mode switching signal from the monitoring unit (control unit) 11.

In the detailed display mode, the output circuit 28 receives a display mode switching signal from the monitoring unit (control unit) 11 so that the binary drive circuit 32 is switched to a non-operating mode and the analog buffer 30 is switched to an operating mode. Each analog buffer 30 receives a gradation voltage output from the D/A converter 24 so as to output an 8-gradation-level drive voltage to the data line outputs S1, S2, S3, . . . .

On the other hand, in the simple display mode, the output circuit 28 receives a display mode switching signal from the monitoring unit (control unit) 11 so that the analog buffer 30 is switched to a non-operating mode and the binary drive circuit 32 is switched to an operating mode. The binary drive circuit 32 receives the most significant bit of a digital signal output from the data latch 22 to the D/A converter 24 so as to output a binary drive voltage to the data line outputs S1, S2, S3, . . . .

Figure 5:
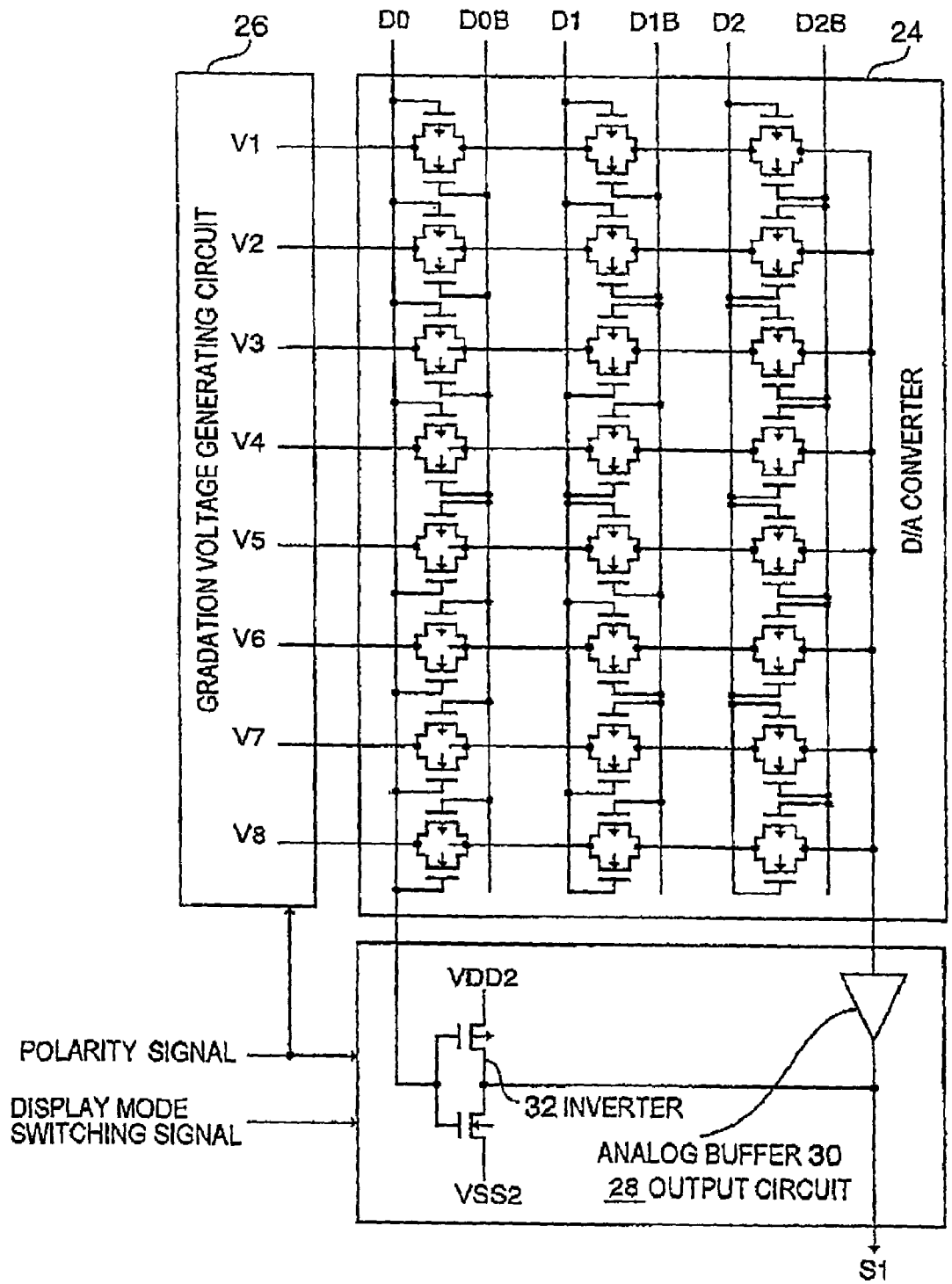
FIG. 5 is a circuit diagram showing the configuration of a gradation voltage generating circuit, and a D/A converter and an output circuit corresponding to one data line output, in a data line drive circuit for performing 8-gradation-level display by using 3 bits of digital data.

FIG. 5 is a circuit diagram showing the configuration of the gradation voltage generating circuit 26, and the D/A converter 24 and the output circuit 28 corresponding to one data line output S1, in the data line drive circuit for performing 8-gradation-level display by using 3 bits of digital data with their inverted data. The gradation voltage generating circuit 26 has 8-level gradation voltages V1 to V8 corresponding to 3 bits of digital data, wherein V1>V2> . . . >V8 or V1<V2< . . . <V8 in accordance with the polarity signal. The D/A converter 24 is formed by CMOS switches, selects a gradation voltage in accordance with a 3-bit digital signal output from the data latch 22, and outputs the selected voltage to the analog buffer 30. Further, the most significant bit D0 of the 3-bit digital signal is supplied to an inverter forming the binary drive circuit 32. In each embodiment of the present invention, the most significant bit means a bit for selecting either a high-voltage side or a low-voltage side of all gradation levels.

The analog buffer 30 normally requires a steady idling current for maintaining its operation. However, the binary drive circuit 32 does not require an idling current if the binary drive circuit 32 is formed by an inverter circuit. Therefore, in the simple display mode, by suspending the analog buffer 30 and by operating the inverter 32, power consumption for a static current of the analog buffer is not required, and the power consumption can be reduced accordingly.

The gradation voltage generating circuit 26 is generally constituted by connecting resistors in series, the number of resisters corresponding to the number of gradation levels. By applying a current to the resistors, a gradation voltage can be extracted from an intermediate tap. Further, in the simple display mode, by blocking the gradation voltage generating circuit 26 (that is, by suspending the current supply), the power consumption in the gradation voltage generating circuit 26 can be reduced.

In FIG. 5, the D/A converter 24 is formed by CMOS switches. However, the D/A converter 24 and the gradation voltage generating circuit 26 can be replaced by a D/A converter and a gradation voltage generating circuit for generating gradation levels by using capacitive coupling.

Figure 6:
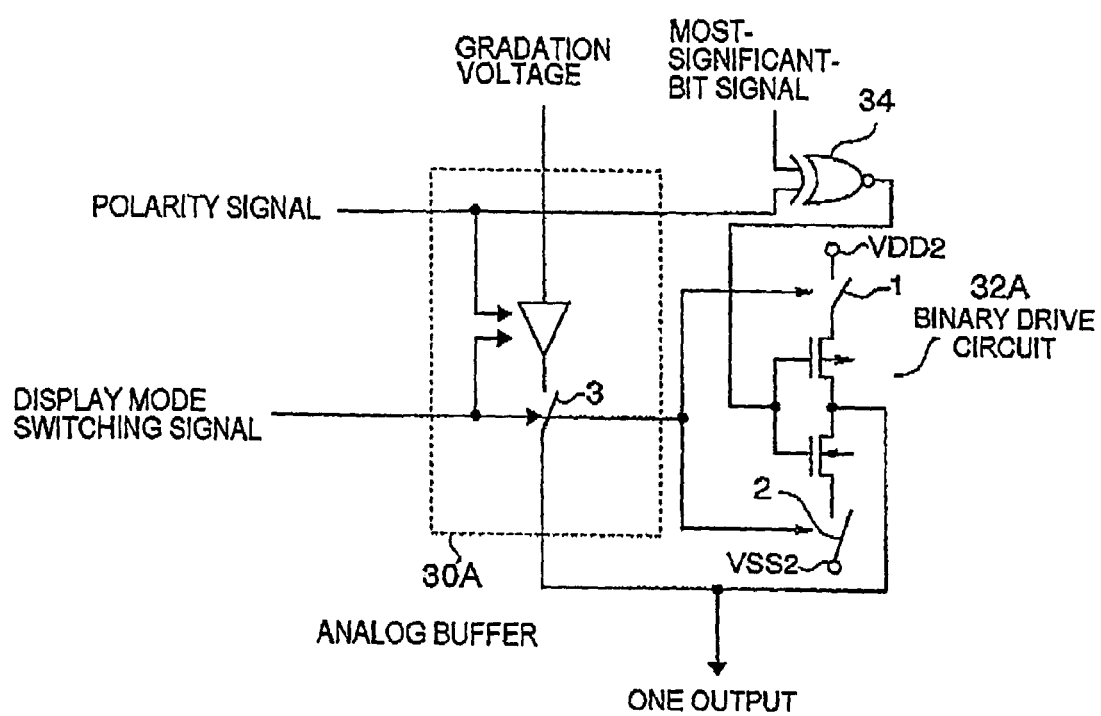
FIG. 6 is a detailed circuit diagram corresponding to one data line output in the output circuit including a polarity signal.

FIG. 6 is a detailed circuit diagram corresponding to one data line output in the output circuit 28 including a polarity signal.

A display mode switching signal controls the operation of a binary drive circuit 32A according to ON/OFF control of switches 1 and 2, blocks the output of an analog buffer 30A according to ON/OFF control of a switch 3, and also controls the operation of the analog buffer 30A. A most-significant-bit signal and a polarity signal are input to an exclusive NOR circuit 34, and the output thereof is supplied to the input of the inverter forming the binary drive circuit 32A. Therefore, the binary drive circuit 32A outputs a power-supply voltage VDD2 or VSS2 to a data line in accordance with the most-significant-bit signal and the polarity signal. On the other hand, the analog buffer 30A amplifies the gradation voltage selected in the D/A converter according to digital data and the polarity and outputs the voltage to the data line.

Herein, the detailed display mode is specified when a display mode switching signal is H, and the simple display mode is specified when a display mode switching signal is L. In the detailed display mode, the display mode switching signal becomes H, the switch 3 is turned ON so that the analog buffer 30A operates, and the switches 1 and 2 are turned OFF so that the binary drive circuit 32A is suspended and the output thereof becomes a high-impedance state. The analog buffer 30A may refer to the polarity signal as required. For example, when the analog buffer 30A includes a plurality of analog buffers, these analog buffers are switched according to the polarity signal so as to be operated.

In the simple display mode, the display mode switching signal becomes L, the switch 3 is turned OFF so that the output of the analog buffer 30A is blocked, and the analog buffer 30A is suspended so that the output thereof becomes a high-impedance state. On the other hand, the switches 1 and 2 are turned ON so that the binary drive circuit 32A is put into an operation mode and the binary drive circuit 32A is driven by the most-significant-bit signal and the polarity signal.

As described above, in the detailed display mode, the output circuit 28 stops the inverter circuit forming the binary drive circuit 32A and operates the analog buffer 30A so as to output a gradation voltage according to the polarity to a data line. On the other hand, in the simple display mode, the output and idling current of the analog buffer 30A are suspended, the inverter circuit forming the binary drive circuit 32A is operated, and the power-supply voltage VDD2 or VSS2 is output to the data line according to the most-significant-bit signal and the polarity signal of digital data.

If the analog buffer requires a data line precharge circuit, the binary drive circuit may also be used as a precharge circuit. In this case, in the detailed display mode (display mode switching signal=H), the switch 3 is turned ON so as to operate the analog buffer. In addition, the switches 1 and 2 are also turned ON so as to operate the binary drive circuit during a period for which precharge is required (precharge period). In the simple display mode (display mode switching signal=L), the switch 3 is turned OFF, the analog buffer is suspended, and the binary drive circuit is operated during one horizontal period, not only during the precharge period. In this description, precharge means that a data line voltage is changed to a predetermined voltage in advance.

Figure 7:
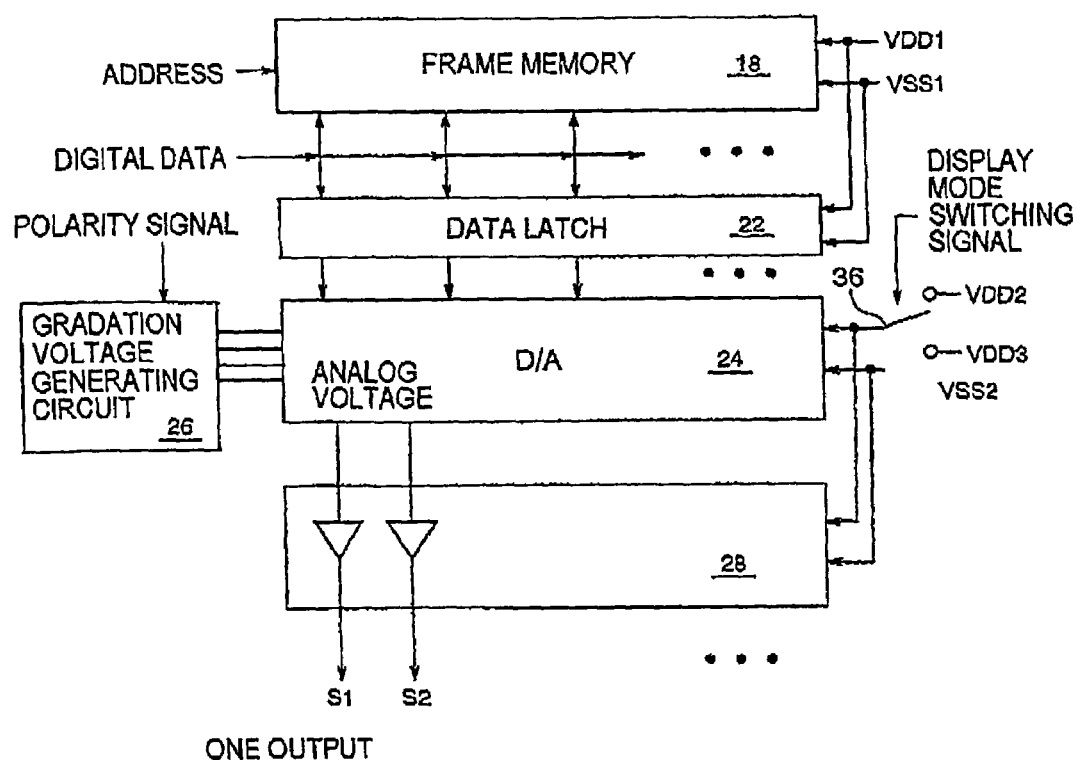
FIG. 7 is a block diagram showing an embodiment in which the entire liquid crystal display unit is driven by decreasing the liquid crystal driving voltage in the simple display mode.

FIG. 7 is a block diagram showing an embodiment in which the entire liquid crystal display unit is driven by decreasing the liquid crystal driving voltage in the simple display mode. Elements which are the same as those in FIG. 4 are denoted by the same reference numerals and the corresponding description will be omitted.

As can be seen by comparing FIGS. 4 and 7, the output circuit 28 does not include a binary drive circuit in the embodiment shown in FIG. 7. However, two different liquid crystal driving voltages VDD2 and VDD3 are alternatively supplied to the D/A converter 24 and the output circuit 28 through a liquid crystal driving voltage selecting switch 36. The liquid crystal driving voltage selecting switch 36 is controlled by a display mode switching signal. Herein, VDD2 is the liquid crystal driving voltage used in the detailed display mode and VDD3 is the liquid crystal driving voltage used in the simple display mode, VDD3 being lower than VDD2. For example, when VDD2 is 5 V, VDD3 is 3 V. Alternatively, a logic power-supply voltage VDD1 may be used as VDD3.

In the detailed display mode, an H-level display mode switching signal switches the liquid crystal driving voltage selecting switch 36 to the liquid crystal driving voltage VDD2 so as to supply the liquid crystal driving voltage VDD2 to the D/A converter 24 and the output circuit 28. In the simple display mode, an L-level display mode switching signal switches the liquid crystal driving voltage selecting switch 36 to the liquid crystal driving voltage VDD3 so as to supply the liquid crystal driving voltage VDD3, which is a low voltage, to the D/A converter 24 and the output circuit 28. Accordingly, the brightness decreases and thus the contrast also decreases, but the power consumption can be reduced.

Alternatively, the configurations of FIGS. 4 and 7 can be combined so that the power consumption can be further reduced.

Figure 8:
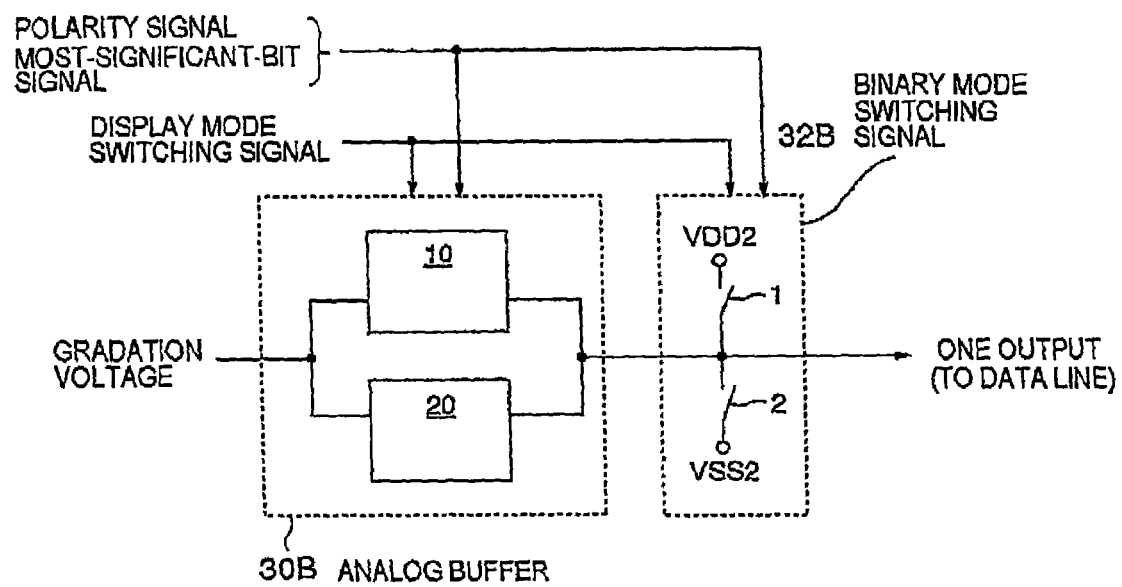
FIG. 8 is a block diagram of a circuit corresponding to one data line output of the output circuit when a binary drive circuit is also used as a data line precharge circuit.

FIG. 8 is a block diagram of a circuit corresponding to one data line output of the output circuit when the above-described binary drive circuit is also used as a data line precharge circuit. In other words, FIG. 8 shows an example in which a precharge circuit is used as a binary drive circuit in the simple display mode, in a drive circuit of a liquid crystal display device configured such that a data line is precharged at the beginning of one output period, as disclosed in Japanese Unexamined Patent Application Publication No. 11-119750 and Japanese Patent Application No. 11-145768 (in a normal display corresponding to the detailed display mode of the present invention, although those inventions do not have distinction between a detailed display mode and a simple display mode).

The output circuit shown in FIG. 8 includes an analog buffer 30B formed by connecting in parallel a buffer 10 having a strong discharging ability and a buffer 20 having a strong charging ability, and a precharge circuit/binary driver circuit 32B connected to the output of the analog buffer. The analog buffer 30B and the precharge circuit/binary drive circuit 32B are controlled by a display mode switching signal, a most-significant-bit signal, and a polarity signal.

When a gradation voltage in a high-voltage side is output in the detailed display mode, where the display mode switching signal is H, a switch 1 of the precharge circuit/binary drive circuit is turned ON so as to precharge a data line to VDD2 at the beginning of one output period, and the buffer 10 is operated so as to decrease the data-line voltage to the gradation voltage. At this time, a switch 2 of the precharge circuit/binary drive circuit is turned OFF and the buffer 20 is suspended.

When a gradation voltage in a low-voltage side is output in the detailed display mode, where the display mode switching signal is H, the switch 2 of the precharge circuit/binary drive circuit is turned ON so as to precharge a data line to VSS2 at the beginning of one output period, and the buffer 20 is operated so as to increase the data-line voltage to the gradation voltage. At this time, the switch 1 of the precharge circuit/binary drive circuit is turned OFF and the buffer 10 is suspended. The voltage VDD2 is higher than VSS2.

In the simple display mode where the display mode switching signal is L, the buffers 10 and 20 are suspended and only the precharge circuit/binary drive circuit is operated. The precharge circuit/binary drive circuit is operated for one output period, not only for a precharge period.

Herein, as in the example shown in FIG. 6, the polarity signal and the most-significant-bit signal are synthesized into one control signal via the exclusive NOR circuit so as to control the analog buffer and the precharge circuit/binary drive circuit. For example, when both of the polarity signal and the most-significant-bit signal are in L-level or in H-level, the switch 1 and the buffer 10 can be operated, while the switch 2 and the buffer 20 are suspended. When one of the polarity signal and the most-significant-bit signal is in L-level and the other is in H-level, the switch 2 and the buffer 20 can be operated, while the switch 1 and the buffer 10 are suspended.

Figure 9:
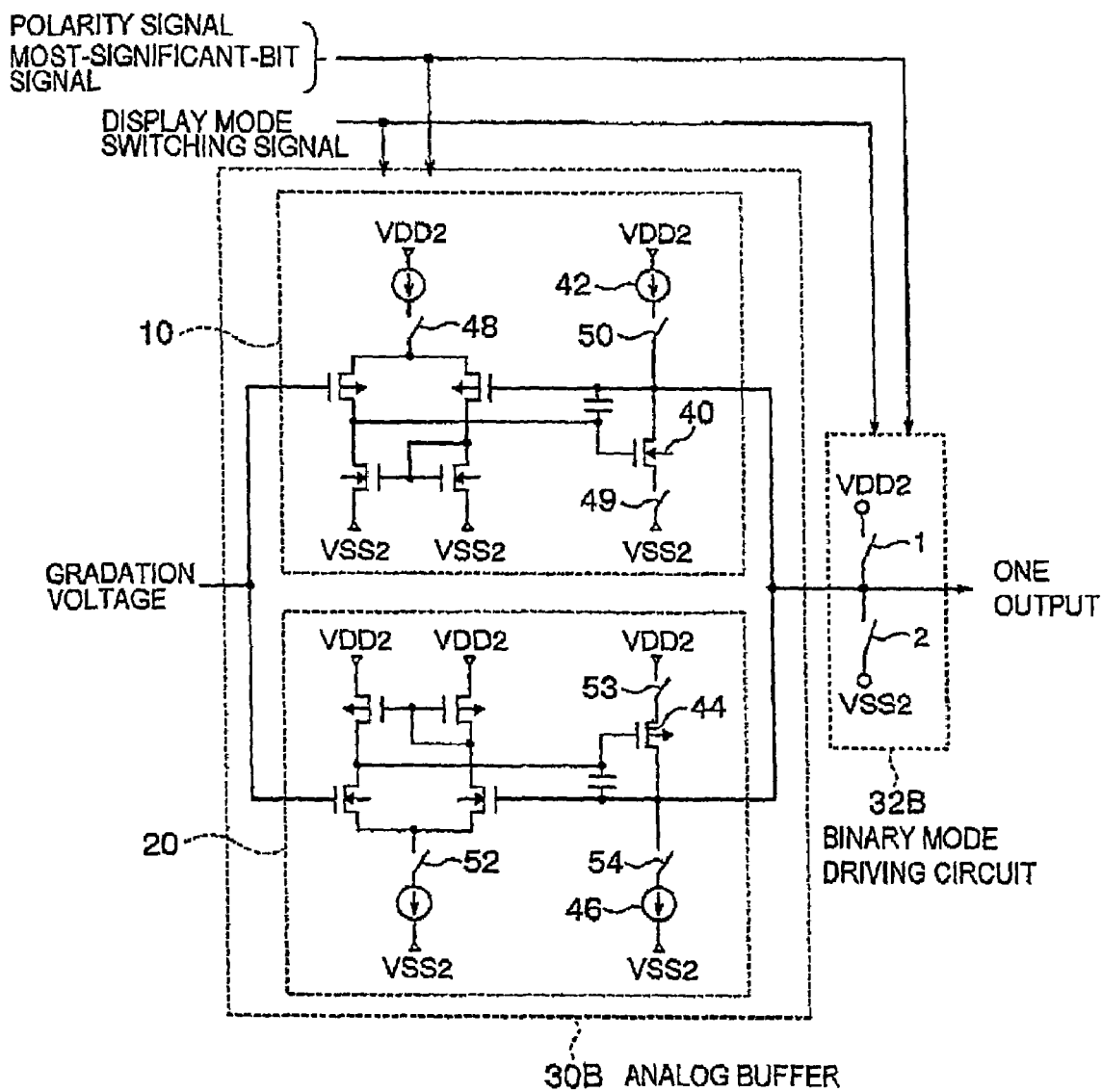
FIG. 9 is a circuit diagram showing a specific example of the circuit shown in FIG. 8.

FIG. 9 is a circuit diagram showing a specific example of the circuit shown in FIG. 8. In the circuit shown in FIG. 9, each of the buffers 10 and 20 of the analog buffer 30B is formed by a known operational amplifier circuit having a phase-compensating capacitor. In the operational amplifier of the buffer 10, an output amplifier stage includes an N-channel transistor 40 and a constant current source 42. The charing function depends on a current controlled by the constant current source 42, but the discharing function is performed by the N-channel transistor 40 so that the operational amplifier can be operated at high-speed. On the other hand, in the operational amplifier of the buffer 20, an output amplifier stage includes a P-channel transistor 44 and a constant current source 46. The step-down function depends on the current controlled by the constant current source 46, but the step-up function is performed by the P-channel transistor 44 so that the operation amplifier can be operated at high-speed. By combining the buffers 10 and 20 and the precharge circuit/binary drive circuit, a high-speed operation can be performed even when the idling current in each of the buffers 10 and 20 is suppressed to be low, and an analog buffer consuming a reduced power can be realized.

The buffers 10 and 20 and the precharge circuit/binary drive circuit shown in FIG. 9 are controlled by the display mode switching signal, the most-significant-bit signal, and the polarity signal, as in the example shown in FIG. 8. Switches 48, 49, and 50 for blocking an.≠idling current are provided in the buffer 10 and switches 52, 53, and 54 are provided in the buffer 20. By controlling the ON/OFF state of the switches, the operation and non-operation of each buffer are controlled.

Figure 10:
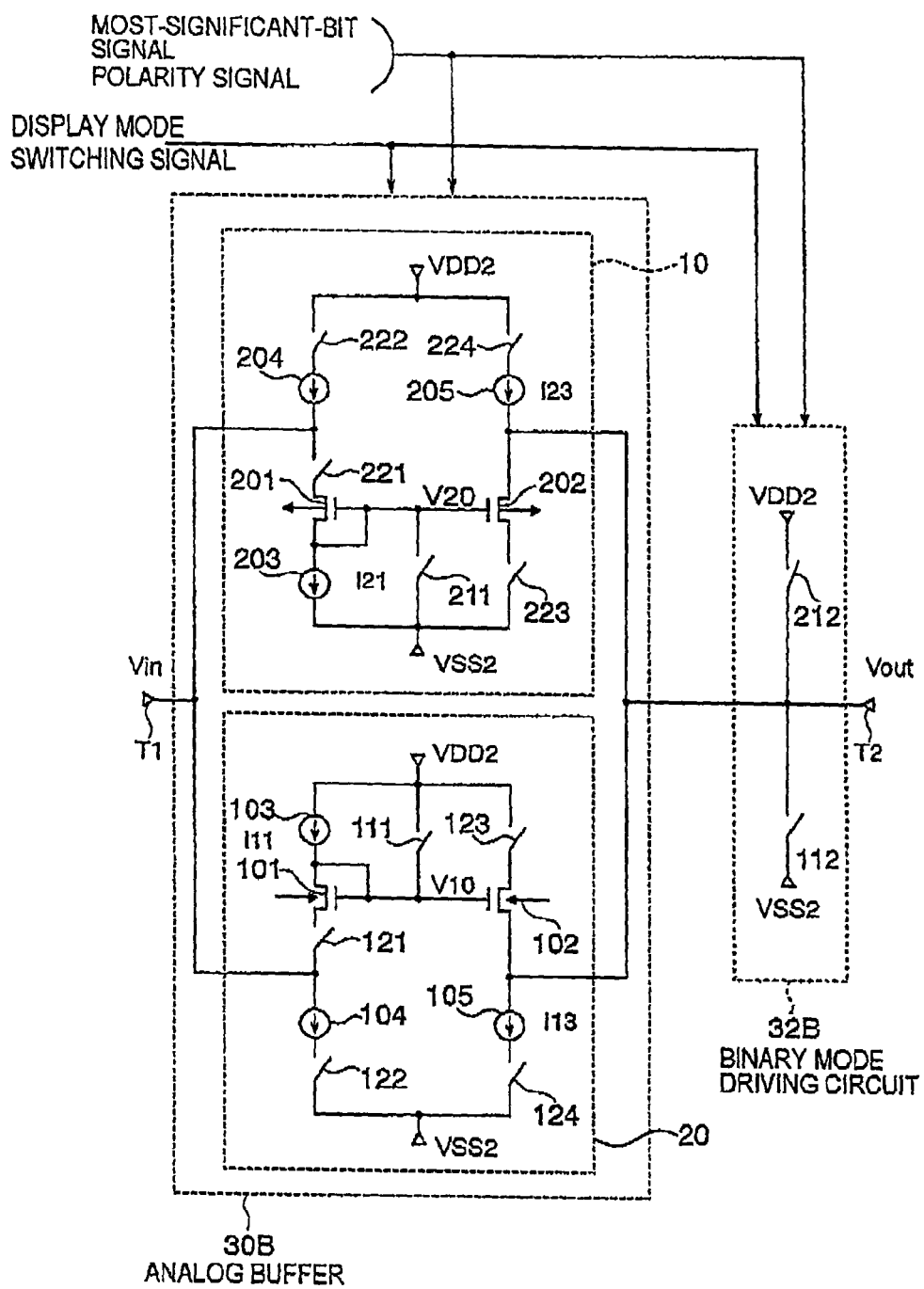
FIG. 10 is a circuit diagram showing another specific example of the circuit shown in FIG. 8.

FIG. 10 is a circuit diagram showing another specific example of the circuit shown in FIG. 8. In the circuit shown in FIG. 10, each of the buffers 10 and 20 of the analog buffer 30B is formed by a drive circuit disclosed in Japanese Patent Application No. 11-145768. Each of the buffers 10 and 20 has a configuration using a source follower operation of a transistor. By combining the precharge circuit/binary drive circuit 32B, a high-speed operation can be performed even when an idling current in each of the buffers 10 and 20 is suppressed to be low, and an analog buffer consuming a reduced power can be realized.

In the buffer 20, a switch 111 is connected between VDD2 and a common gate of NMOS transistors 101 and 102 in order to precharge the common gate of the NMOS transistors 101 and 102, and a switch 112 is connected between an output terminal T2 and VSS2 in order to precharge the output terminal T2. The drain of the transistor 101 is connected to VDD2 through a constant current source 103 and is also connected to its own gate. Also, a switch 121 for blocking the drain-source current of the transistor 101 is connected between the source of the transistor 101 and an input terminal T1. A constant current source 104 and a switch 122 are connected in series between the input terminal T1 and VSS2. The source of the transistor 102 is connected to the output terminal T2, a switch 123 for blocking the drain-source current of the transistor 102 is connected between VDD2 and the drain of the transistor 102, and a constant current source 105 and a switch 124 are connected in series between the output terminal T2 and VSS2. Currents controlled by the constant current sources 103 and 105 are I11 and I13, respectively.

In the buffer 10, a switch 211 is connected between VSS2 and a common gate of PMOS transistors 201 and 202 in order to precharge the common gate of the PMOS transistors 201 and 202, and a switch 212 is connected between the output terminal T2 and VDD2 in order to precharge the output terminal T2. The drain of the transistor 201 is connected to VSS2 through a constant current source 203 and is also connected to its own gate. Also, a switch 221 for blocking the drain-source current of the transistor 201 is connected between the source of the transistor 201 and the input terminal T1. A constant current source 204 and a switch 222 are connected in series between the input terminal T1 and VDD2. The source of the transistor 202 is connected to the output terminal T2, a switch 223 for blocking the drain-source current of the transistor 202 is connected between VSS2 and the drain of the transistor 202, and a constant current source 205 and a switch 224 are connected in series between the output terminal T2 and VDD2. Currents controlled by the constant current sources 203 and 205 are I21 and I23, respectively.

In the circuit shown in FIG. 10, the operation and non-operation of the switches 112 and 212 and the buffers 10 and 20 are controlled by the most significant bit of a digital signal and a polarity signal, as described above. In the detailed display mode, when a gradation voltage in a high-voltage side is input as Vin, the switch 112 and all the switches in the buffer 10 are kept to be OFF during the output period. When a gradation voltage in a low-voltage side is input as Vin, the switch 212 and all the switches in the buffer 20 are kept to be OFF during the output period.

Figure 11:
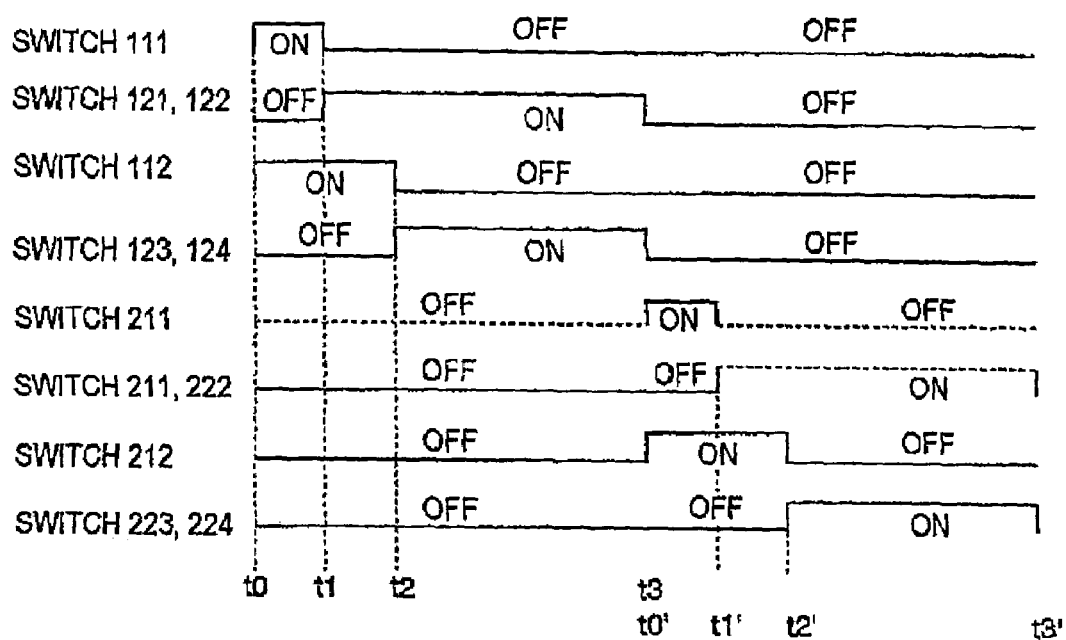
FIG. 11 is a timing chart illustrating the operation of the circuit shown in FIG. 10 in the detailed display mode.

FIG. 11 is a timing chart illustrating the operation of the circuit shown in FIG. 10 in the detailed display mode. FIG. 11 shows two output periods, that is, an output period (time t0 to t3) in which an arbitrary gradation voltage in a low-voltage side is output and an output period (time t0' to t3') in which an arbitrary gradation voltage in a high-voltage side is output. The operation will be described with reference to FIG. 11. During time t0 to t3, the switches 111, 112, 121, 122, 123, and 124 are controlled as shown in FIG. 11, and the switches 211, 212, 221, 222, 223, and 224 are turned OFF.

At time t0, the output voltage Vout is precharged by the voltage VSS2. ON the other hand, a voltage V10 at the common gate of the transistors 101 and 102 is precharged by the voltage VDD2. The precharge of the voltage V10 is completed at time t1, and from time t1, the voltage V10 changes to a voltage which is shifted from the input voltage Vin by the gate-source voltage Vgs101 (I11) of the transistor 101. Then, the voltage is stabilized when V10=Vin+Vgs101 (I11). Herein, Vgs101 (I11) represents the gate-source voltage when the drain current is I11. The precharge of the output voltage Vout by the voltage VSS2 which has started at time t0 is completed at time t2. From time t2, the output voltage Vout changes to a voltage which is shifted from the voltage V10 by the gate-source voltage Vgs102 (I13) of the transistor 102. Then, the voltage is stabilized when Vout=V10−Vgs102 (I13). Herein, both of Vgs101 (I11) and Vgs102 (I13) are positive values. By controlling the currents I11 and I13 so that these values are equal, the output voltage Vout becomes equal to the input voltage Vin by the above two expressions. Further, the range of the output voltage is VSS2≦c=Vout≦VDD2−Vgs102 (I13).

During time t0' to t3', the switches 211, 212, 221, 222, 223, and 224 are controlled as shown in FIG. 11, and the switches 111, 112, 121, 122, 123, and 124 are turned OFF.

At time t0', the output voltage Vout is precharged by the voltage VDD2 at time t0. ON the other hand, a voltage V20 at the common gate of the transistors 201 and 202 is precharged by the voltage VSS2. The precharge of the voltage V20 s completed at time t1', and from time t1', the voltage V20 changes to a voltage which is shifted from the input voltage Vin by the gate-source voltage Vgs201 (I21) of the transistor 201. Then, the voltage is stabilized when V20=Vin+Vgs210 (I21), The precharge of the output voltage Vout by the voltage VDD2 which has started at time t0' is completed at time t2'. From time t2', the output voltage Vout changes to a voltage which is shifted from the voltage V20 by the gate-source voltage Vgs202 (I23) of the transistor 202. Then, the voltage is stabilized when Vout=V20−Vgs202 (I23). Herein, both of Vgs201 (I21) and Vgs202 (I23) are negative values. By controlling the currents I21 and I23 so that these values are equal, the output voltage Vout becomes equal to the input voltage Vin by the above two expressions. Further, the range of the output voltage is VSS2−Vgs202 (I23)≦Vout≦VDD2.

If the gradation voltage in a low-voltage side is lower than {VDD2−Vgs102 (I13)} and the gradation voltage in a high-voltage side is higher than {VSS2−Vgs202 (I23)}, the range of the output voltage can be the range of a power-supply voltage.

Figure 12:
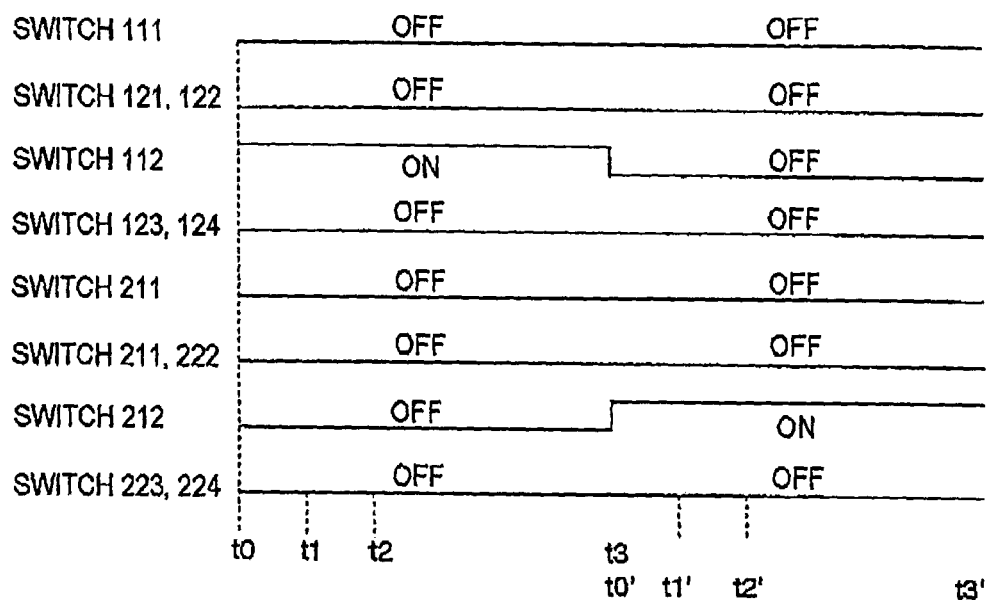
FIG. 12 is a timing chart illustrating the operation of the circuit shown in FIG. 10 in the simple display mode.

FIG. 12 is a timing chart illustrating the operation of the circuit shown in FIG. 10 in the simple display mode. In the simple display mode, the all switches in the buffers 10 and 20 are kept to be OFF.

In the output period (time t0 to t3) in which an arbitrary gradation voltage in a low-voltage side is output, the switch 112 is ON and the switch 212 is OFF throughout the entire period. In the output period (time t0' to t3') in which an arbitrary gradation voltage in a high-voltage side is output, the switch 212 is ON and the switch 112 is OFF throughout the entire period. That is, the precharge including the switches 112 and 212 is used as a binary drive circuit.

Various embodiments of a drive circuit have been described. The embodiments are premised on the configuration as shown in FIG. 4, that is, the configuration in which a polarity signal is supplied to the gradation voltage generating circuit 26 and the output circuit 28. However, the drive circuit may be configured such that the polarity signal is supplied to the D/A converter 24 or the data latch 22 instead of to the gradation voltage generating circuit 26 and the output circuit 28 so that digital data is inverted according to the polarity. When the drive circuit is configured in that manner, the polarity signal is not necessarily supplied to the output circuit 28. Those skilled in the art will understand that the drive circuit shown in FIGS. 5, 6, and 8 to 10 can be modified so that the polarity signal is not received.

In the above description, the present invention is applied to mobile phones. However, the present invention can be applied to mobile apparatuses including a TFT-LCD display device other than mobile phones. For example, the present invention can be applied to wrist watches including a TFT-LCD display device.

Also, the switching function for the simple display mode and the detailed display mode of the present invention can be applied to mobile apparatuses including a TFT-LCD display device which do not have a call function. In that case, too, power consumption can be reduced.

Figure 13:
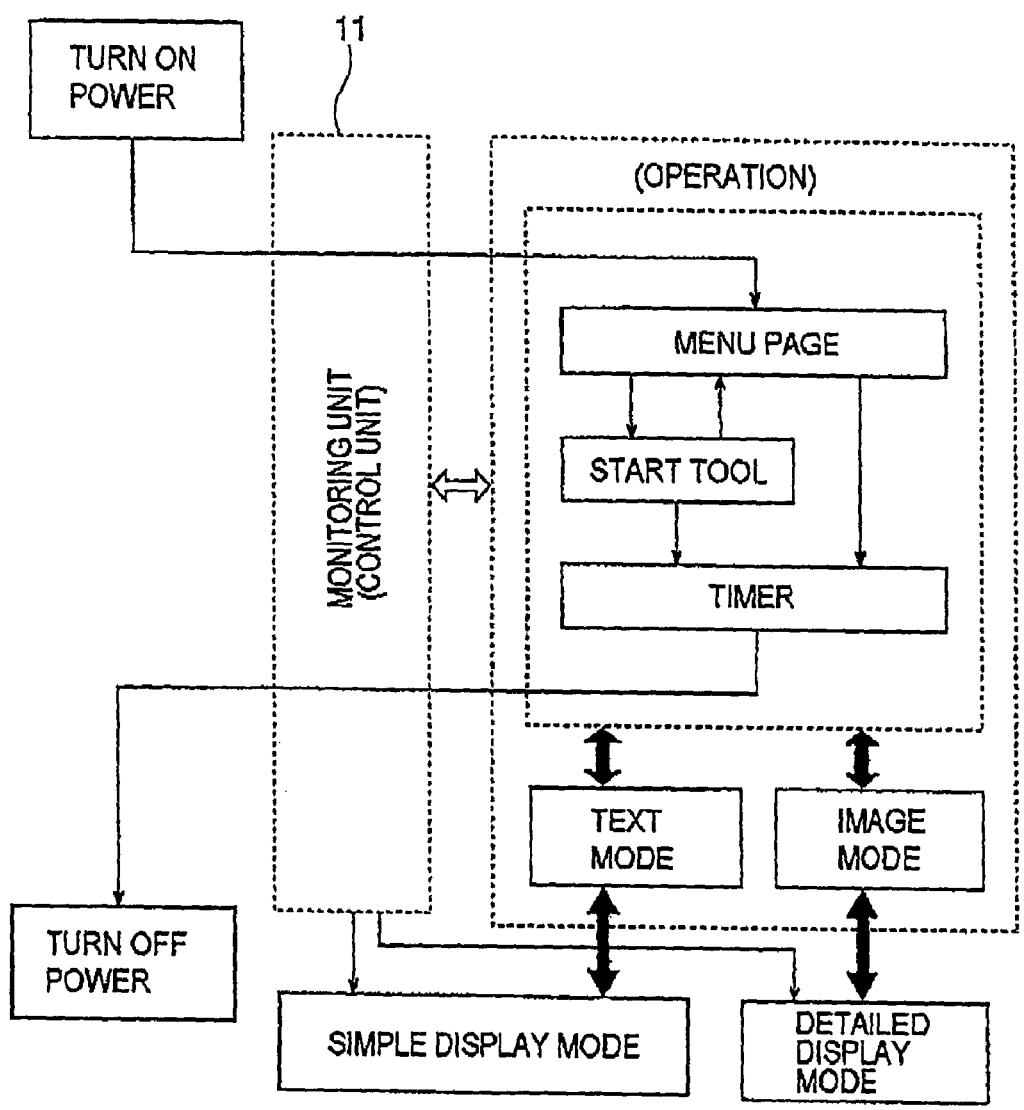
FIG. 13 illustrates a power-saving driving method for a mobile apparatus according to an embodiment of the present invention.

FIG. 13 shows a power-saving driving method for a mobile apparatus according to an embodiment of the present invention. By turning ON the power of a mobile apparatus in an OFF state, a menu page is displayed on a display unit of the mobile apparatus under the control of a monitoring unit (control unit) 11. Various software tools can be selected on the menu page, and the menu page is displayed again when the tool is ended. Also, a timer is operated, and the power of the mobile apparatus is automatically turned OFF under the control of the monitoring unit (control unit) 11 after a predetermined time has elapsed in a non-operating state.

When the power of the mobile apparatus is ON, the monitoring unit (control unit) in the mobile apparatus can determine whether a text mode in which only character information and icons are displayed or an image mode in which image information and so on is displayed is set. The monitoring unit (control unit) controls the mobile apparatus so that the liquid crystal display of the mobile apparatus operates in the simple display mode in the text mode and operates in the detailed display mode in the image mode. The liquid crystal display is displayed with all gradation levels in the detailed display mode and is displayed by reducing the number of gradation levels in the simple display mode. When only character information is displayed or when icons of a menu page are displayed, a multi-color display using more than hundreds of colors is not always required. Thus, display can be performed with reduced power consumption by reducing the number of gradation levels.

The monitoring unit (control unit) determines whether the text mode or the image mode is set relatively easily by using a software tool for displaying an image. For example, when a tool for displaying an image is started by using a tool selection page in the text mode, the mode is switched to the image mode where display with all gradation levels can be performed. When the tool ends, the mode can be easily returned to the text mode.

Further, in mobile apparatuses having a TFT-LCD display unit, including mobile phones, the simple display mode and the detailed display mode can be automatically selected under the control of the monitoring unit (control unit). Alternatively, the user can freely select the simple display mode and the detailed display mode. For example, a mobile apparatus may be first set to the simple display mode and the TFT-LCD display unit may be driven in the simple display mode when it is used. Alternatively, the user may switch the mobile apparatus to the detailed display mode every time the user uses the apparatus or while the user uses the apparatus. The setting and switching may be performed by using an operation button of the mobile apparatus, or may be performed by software. In either case, those skilled in the art can easily realize the setting and switching.

The liquid crystal driving method in the simple display mode may be the same as each of the embodiments shown in FIGS. 4 to 6 and 8 to 12.

INDUSTRIAL APPLICABILITY

As described above, according to the present invention, the entire liquid crystal display unit is displayed in a simple display mode at least in a non-operating standby mode in a mobile phone having a liquid crystal display unit. In the simple display mode, the entire liquid crystal display unit is driven by reducing the number of gradation levels or by decreasing a liquid crystal driving voltage. By using such a controlling method, the power consumption of the liquid crystal display unit can be reduced in the non-operating standby mode. On the other hand, necessary information such as time and the amount of remaining battery is displayed such that the information can be read.

The invention claimed is:

1. A power-saving driving method for a mobile phone including a liquid crystal display unit which is driven in a detailed display mode with all gradation levels, wherein,
    at least in a non-operating standby mode, the liquid crystal display unit is driven in a simple display mode in which the entire liquid crystal display unit is displayed with a smaller amount of electrical power as compared with the detailed display mode,
    wherein the entire liquid crystal display unit is driven by reducing the number of gradation levels in the simple display mode.

2. The method according to claim 1, wherein, in a mode other than the non-operating standby mode, the entire liquid crystal display unit is driven in the simple display mode while a specific software tool is not operated.

3. A power-saving driving method for a mobile phone comprising a liquid crystal display unit which is driven in a detailed display mode with all gradation levels, wherein,
    at least in a non-operating standby mode, the liquid crystal display unit is driven in a simple display mode in which the entire liquid crystal display unit is displayed with a smaller amount of electrical power as compared with the detailed display mode,
    wherein the liquid crystal display unit is driven in the simple display mode when the mobile phone touches an ear of the user.

4. The method according to claim 1, wherein the entire liquid crystal display unit is driven by using a binary drive circuit in the simple display mode.

5. The method according to claim 3, wherein the entire liquid crystal display unit is driven by decreasing a liquid crystal driving voltage in the simple display mode.

6. A mobile apparatus including a liquid crystal display unit which is driven in a detailed display mode with all gradation levels, wherein, in a simple display mode, the entire liquid crystal display unit is driven with a smaller amount of electrical power as compared with the detailed display mode, and the liquid crystal display unit is driven in one of the detailed display mode and the simple display mode, wherein the entire liquid crystal display unit is driven by reducing the number of gradation levels in the simple display mode.

7. The mobile apparatus according to claim 6, wherein the entire liquid crystal display unit is driven in the simple display mode while a specific software tool is not operated.

8. The mobile apparatus according to claim 6, wherein the entire liquid crystal display unit is driven by using a binary drive circuit in the simple display mode.

9. A mobile phone comprising the mobile apparatus according to claim 6.

10. The mobile phone according to claim 9, wherein the liquid crystal display unit is driven in the simple display mode when the mobile phone is in a standby mode.

11. A mobile phone comprising a liquid crystal display unit which is driven in a detailed display mode with all gradation levels, wherein, in a simple display mode, the entire liquid crystal display unit is driven with a smaller amount of electrical power as compared with the detailed display mode, and the liquid crystal display unit is driven in one of the detailed display mode and the simple display mode, wherein the liquid crystal display unit is driven in the simple display mode during a phone call.

* * * * *